United States Patent
Warsaw et al.

(10) Patent No.: US 11,985,505 B2
(45) Date of Patent: May 14, 2024

(54) WIRELESS COMMUNICATION SYSTEM WITH ACCESSORY DEVICE PAIR AND RELATED DEVICES AND METHODS

(71) Applicant: Eagle Technology, LLC, Melbourne, FL (US)

(72) Inventors: Thomas B. Warsaw, West Henrietta, NY (US); Thomas J. Philbin, Pittsford, NY (US)

(73) Assignee: EAGLE TECHNOLOGY, LLC, Melbourne, FL (US)

(*) Notice: Subject to any disclaimer, the term of this patent is extended or adjusted under 35 U.S.C. 154(b) by 332 days.

(21) Appl. No.: 16/532,573

(22) Filed: Aug. 6, 2019

(65) Prior Publication Data
US 2021/0044966 A1 Feb. 11, 2021

(51) Int. Cl.
*H04W 12/50* (2021.01)
*H04M 1/72412* (2021.01)
*H04W 12/06* (2021.01)

(52) U.S. Cl.
CPC ....... *H04W 12/50* (2021.01); *H04M 1/72412* (2021.01); *H04W 12/06* (2013.01); *H04M 2250/02* (2013.01)

(58) Field of Classification Search
CPC . H04W 12/50; H04M 1/72412; H04M 12/06; H04M 2250/02
USPC .......................................................... 726/9
See application file for complete search history.

(56) References Cited

U.S. PATENT DOCUMENTS

| | | | | |
|---|---|---|---|---|
| 8,130,958 B2* | 3/2012 | Schrum, Jr. | ......... | H04L 63/0428 380/278 |
| 8,190,129 B2* | 5/2012 | Ben Ayed | ............... | G06F 21/35 455/410 |
| 8,260,262 B2* | 9/2012 | Ben Ayed | ............... | G06F 21/32 455/410 |
| 10,382,203 B1* | 8/2019 | Loladia | .................. | H04L 63/06 |
| 2007/0188323 A1* | 8/2007 | Sinclair | .................. | G06F 3/017 340/568.1 |
| 2008/0013601 A1* | 1/2008 | Lind | .................. | H04W 52/283 375/140 |
| 2008/0268776 A1* | 10/2008 | Amendola | ............ | H04W 8/005 455/41.2 |

(Continued)

OTHER PUBLICATIONS

Anonymous "APX Mission Critical Wireless Accessories" motorolasolutions.com/apx; retrieved from internet Jul. 12, 2019. pp. 4.

(Continued)

*Primary Examiner* — April G Gonzales
(74) *Attorney, Agent, or Firm* — ALLEN, DYER, DOPPELT, + GILCHRIST, P.A.

(57) ABSTRACT

A wireless communication system may include a mobile wireless communications device and a wireless accessory device to be paired with it. The wireless accessory device may have a wireless transceiver and an antenna coupled to the wireless transceiver. The wireless transceiver and the antenna may be operable in an initial mode and an operational mode after successful pairing. The initial mode may have a shorter range than the operational mode. The mobile wireless communications device may exchange pairing tokens with the wireless accessory device using the initial mode, and communicate with the wireless accessory device using the operational mode after successful pairing.

20 Claims, 4 Drawing Sheets

(56) References Cited

U.S. PATENT DOCUMENTS

| | | | | |
|---|---|---|---|---|
| 2012/0015605 | A1* | 1/2012 | Sole | H04W 12/06 |
| | | | | 455/41.3 |
| 2012/0184372 | A1* | 7/2012 | Laarakkers | H04M 1/72427 |
| | | | | 463/40 |
| 2013/0029596 | A1* | 1/2013 | Preston | H04W 52/0241 |
| | | | | 455/41.1 |
| 2013/0076645 | A1* | 3/2013 | Anantha | G06F 3/0488 |
| | | | | 345/173 |
| 2013/0298208 | A1* | 11/2013 | Ayed | G06F 21/43 |
| | | | | 375/259 |
| 2014/0188348 | A1* | 7/2014 | Gautama | B60W 10/30 |
| | | | | 701/48 |
| 2014/0380419 | A1* | 12/2014 | Peluso | H04W 12/50 |
| | | | | 726/3 |
| 2015/0207626 | A1* | 7/2015 | Neftel | G16H 40/67 |
| | | | | 713/168 |
| 2015/0359022 | A1* | 12/2015 | Lau | H04W 76/14 |
| | | | | 455/41.2 |
| 2016/0065301 | A1* | 3/2016 | Kukulski | H04W 4/80 |
| | | | | 455/41.2 |
| 2016/0142891 | A1* | 5/2016 | Virhiä | G06Q 50/01 |
| | | | | 340/870.07 |
| 2016/0155281 | A1* | 6/2016 | O'Toole | H04W 12/50 |
| | | | | 340/5.64 |
| 2017/0041304 | A1* | 2/2017 | Tal | H04L 41/0886 |
| 2017/0154326 | A1* | 6/2017 | Jo | H04W 4/06 |
| 2017/0201886 | A1* | 7/2017 | Yang | H04W 12/06 |
| 2017/0273127 | A1* | 9/2017 | Glass | H04W 4/026 |
| 2017/0337652 | A1* | 11/2017 | Sarin | H04N 1/4493 |
| 2018/0053176 | A1* | 2/2018 | Rawat | G06Q 20/40 |
| 2018/0144563 | A1* | 5/2018 | Reymann | E05F 15/76 |
| 2019/0028141 | A1* | 1/2019 | Padden | H04B 1/7156 |

OTHER PUBLICATIONS

Anonymous "Mission Critical Wireless Accessories:Second Nature so You Won't Second Guess" motorolasolutions.com/apx; Retrieved from internet Jul. 12, 2019; pp. 4.

Matthew Panzarino "Apple Uses Bluetooth LE to Enable Apple TV 'Touch to Set Up' Via iOS7 Device" https://techcrunch.com/2013/09/25/apple-turns-apple-tv-into-an-ibeacon-to-enable-touch-to-set-up-with-ios-7-devices/?renderMode=ie11; Retrieved from internew Jul. 11, 2019; pp. 8.

\* cited by examiner

WIRELESS COMMUNICATION SYSTEM WITH ACCESSORY DEVICE PAIR AND RELATED DEVICES AND METHODS

TECHNICAL FIELD

The present disclosure relates to the field of communications, and, more particularly, to mobile wireless communication devices and related methods.

BACKGROUND

Mobile communications devices have become an integral part of society over the last two decades. Indeed, more than eighty-two percent of Americans own a mobile communications device, for example, a cell phone. The typical mobile communications device includes an antenna, and a transceiver coupled to the antenna. The transceiver and the antenna cooperate to transmit and receive communication signals.

In many applications, the mobile communications device is paired with a wireless accessory device, for example, a wireless handset, a wireless speaker, or a wireless media platform. One common communications standard for wireless accessories is the Bluetooth wireless standard, which is maintained by the Bluetooth Special Interest Group. The Bluetooth wireless standard is for exchanging data between wireless devices over short distances using short-wavelength ultra high frequency (UHF) radio waves in the industrial, scientific and medical radio bands, from 2.400 to 2.485 GHz.

The Bluetooth wireless transceiver is nearly ubiquitous on mobile communications devices, regardless of platform or mobile operating system. Because of this, many wireless accessory devices are configured to at least operate on this standard. Typically, before communications between the mobile communications device and the wireless accessory device can start, the devices need to undergo a pairing process.

In some applications, the pairing process is rather unsecure. For example, with many wireless audio speaker accessory devices, the wireless audio speaker accessory device is placed in a pairing mode for pairing with any devices within range. Since the wireless audio speaker accessory device has a limited input-output interface, this pairing process is susceptible to the man in the middle attack. The same pairing process is used in many wireless handset accessory devices.

Another approach to Bluetooth pairing is the out of band (OOB) method. The OOB method uses an external means of communication, such as near-field communication (NFC), to exchange some information (e.g. shared key) used in the pairing process. The pairing process requires the shared key that was previously exchanged OOB, but the actual pairing still occurs via the Bluetooth wireless standard.

SUMMARY

Generally, a wireless communication system may include a mobile wireless communications device and a wireless accessory device to be paired therewith. The wireless accessory device may include a wireless transceiver and an antenna coupled thereto. The wireless transceiver and the antenna may be operable in an initial mode and an operational mode after successful pairing. The initial mode may have a shorter range than the operational mode. The mobile wireless communications device may exchange pairing tokens with the wireless accessory device using the initial mode, and communicate with the wireless accessory device using the operational mode after successful pairing.

In particular, the wireless transceiver may comprise a dual-mode Bluetooth transceiver so that the initial mode uses Bluetooth Low Energy, and the operational mode uses Bluetooth Classic. The mobile wireless communications device may comprise an accelerometer configured to determine a physical bump by the wireless accessory device during pairing. The wireless accessory device may comprise an accelerometer configured to determine a physical bump by the mobile wireless communications device during pairing.

In some embodiments, the mobile wireless communications device may comprise an audio input device configured to sense an audio tone from the wireless accessory device during pairing. The mobile wireless communications device may be configured to determine a signal strength from the wireless accessory device during pairing.

Additionally, the mobile wireless communications device may be configured to determine a signed device identifier value from the wireless accessory device during pairing. The mobile wireless communications device may comprise a land mobile radio device operable in at least one of a very high frequency (VHF) band, a UHF band, and a cellular telephone frequency band. The wireless accessory device may comprise at least one of an audio input transducer and an audio output transducer.

Another aspect is directed to a mobile wireless communications device to be paired with a wireless accessory device comprising a first wireless transceiver and a first antenna coupled thereto. The first wireless transceiver and the first antenna may be operable in an initial mode and an operational mode after successful pairing. The initial mode may have a shorter range than the operational mode. The mobile wireless communications device may include a second wireless transceiver, a second antenna coupled thereto, and a processor coupled to the second wireless transceiver and the second antenna. The processor may be configured to exchange pairing tokens with the wireless accessory device using the initial mode, and communicate with the wireless accessory device using the operational mode after successful pairing.

Yet another aspect is directed to a method of operating a wireless communication system comprising a mobile wireless communications device and a wireless accessory device to be paired therewith. The wireless accessory device may include a wireless transceiver and an antenna coupled thereto. The wireless transceiver and the antenna may be operable in an initial mode and an operational mode after successful pairing. The initial mode may have a shorter range than the operational mode. The method may include operating the mobile wireless communications device to exchange pairing tokens with the wireless accessory device using the initial mode, and operating the mobile wireless communications device to communicate with the wireless accessory device using the operational mode after successful pairing.

DETAILED DESCRIPTION

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout.

As discussed, the pairing of wireless accessory devices can present a security risk to attacks, for example, the man in the middle attack. Although the OOB approach does address the risk, the GOB approach has some potential drawbacks. For instance, in devices with NFC enabled OOB approaches, the devices may have increased cost and size due to the additional NFC transceiver and antenna. Moreover, NFC antennas may present special design demands on the host device to avoid self-interference.

Another approach to OOB includes using a proprietary transceiver to replace the NFC transceiver. Again, this approach may have the same drawbacks of cost and size to the host device. In yet another approach, the host device may use proximity detection via Bluetooth Low Energy (BLE) to pair the devices. This approach is again susceptible to the man in the middle attack.

Figure 1A:
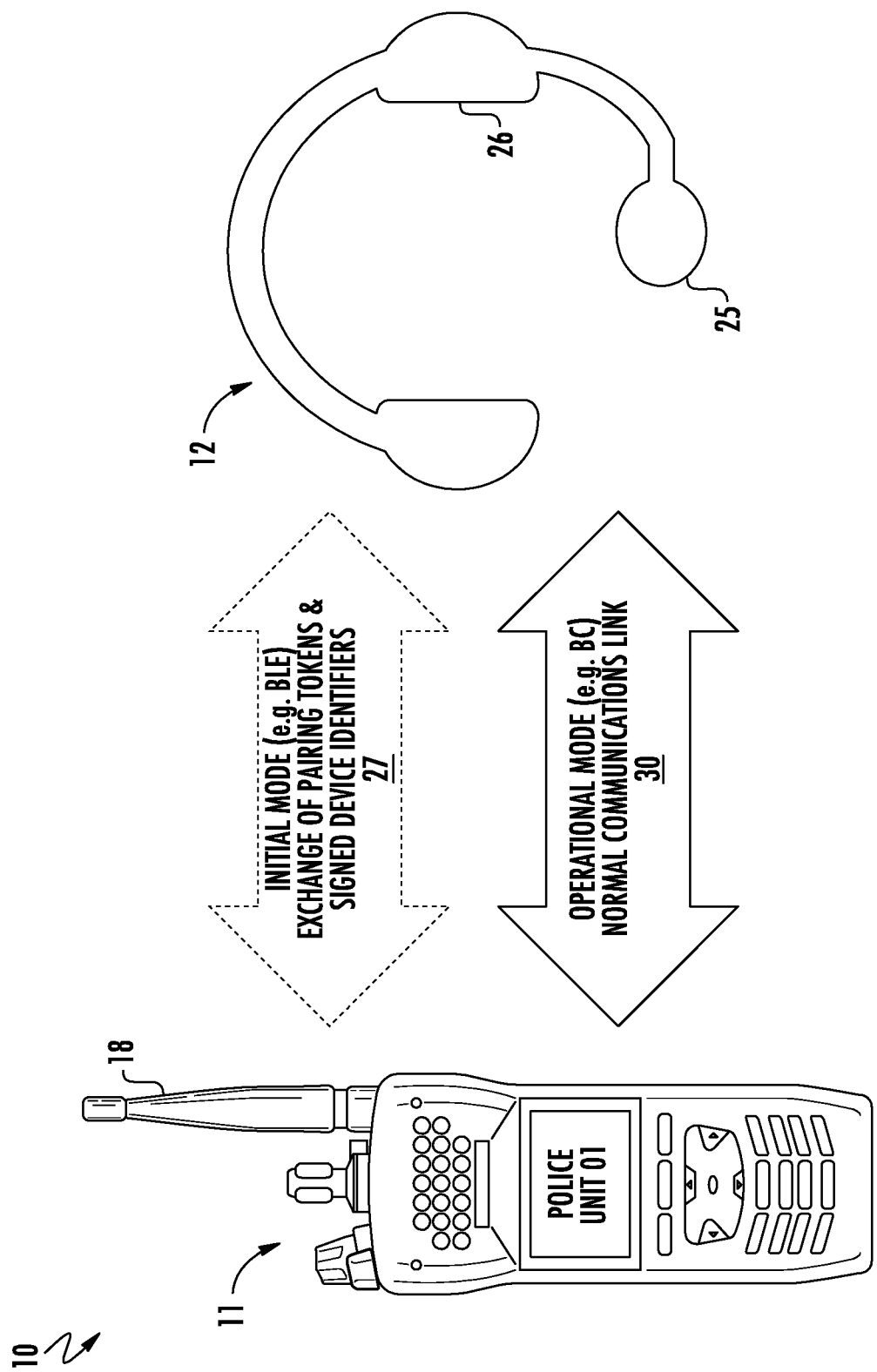
FIGS. 1A and 1B are schematic diagrams of an example embodiment of a wireless communication system, according to the present disclosure.
Figure 1B:
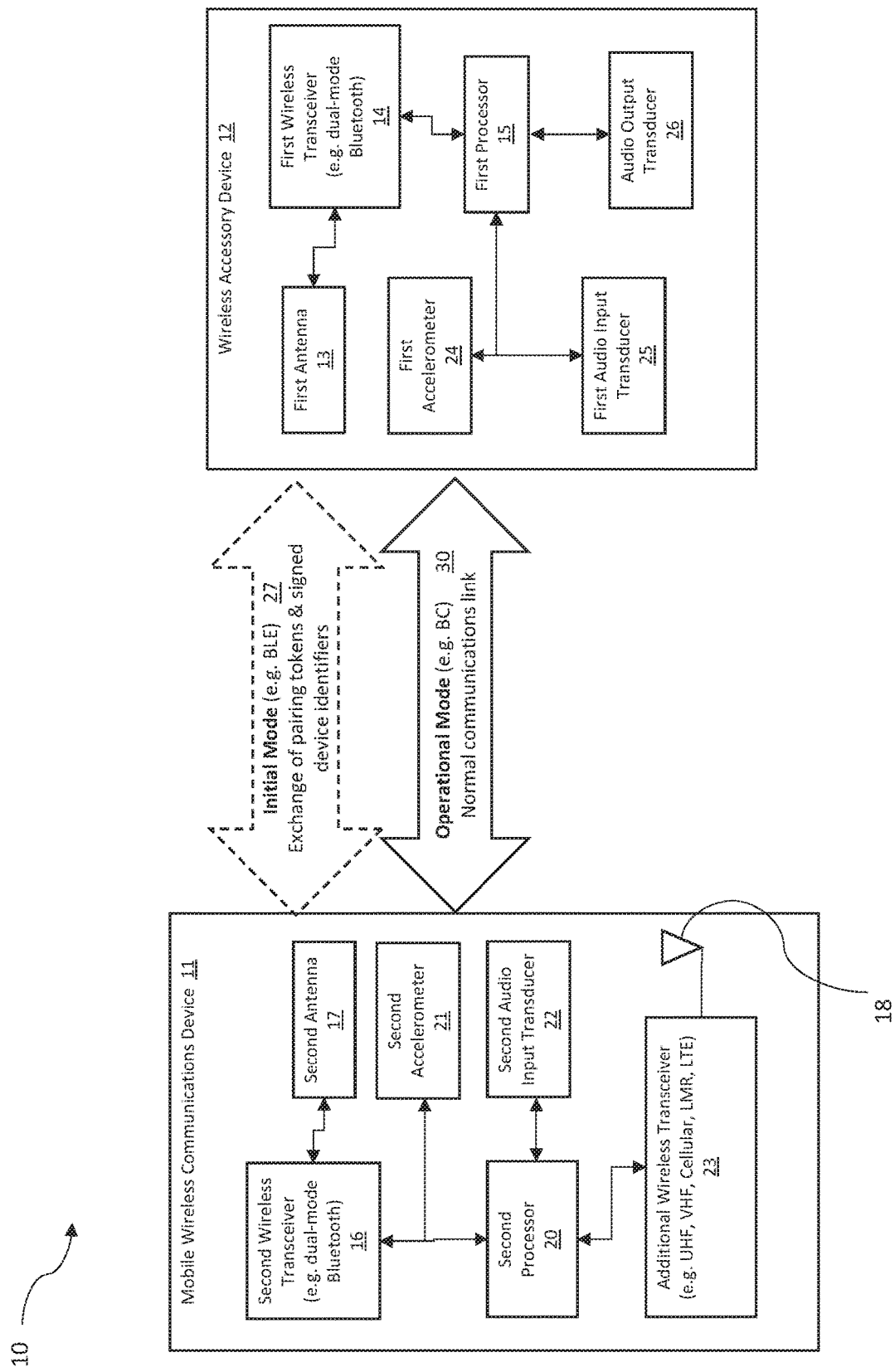
Figure 2:
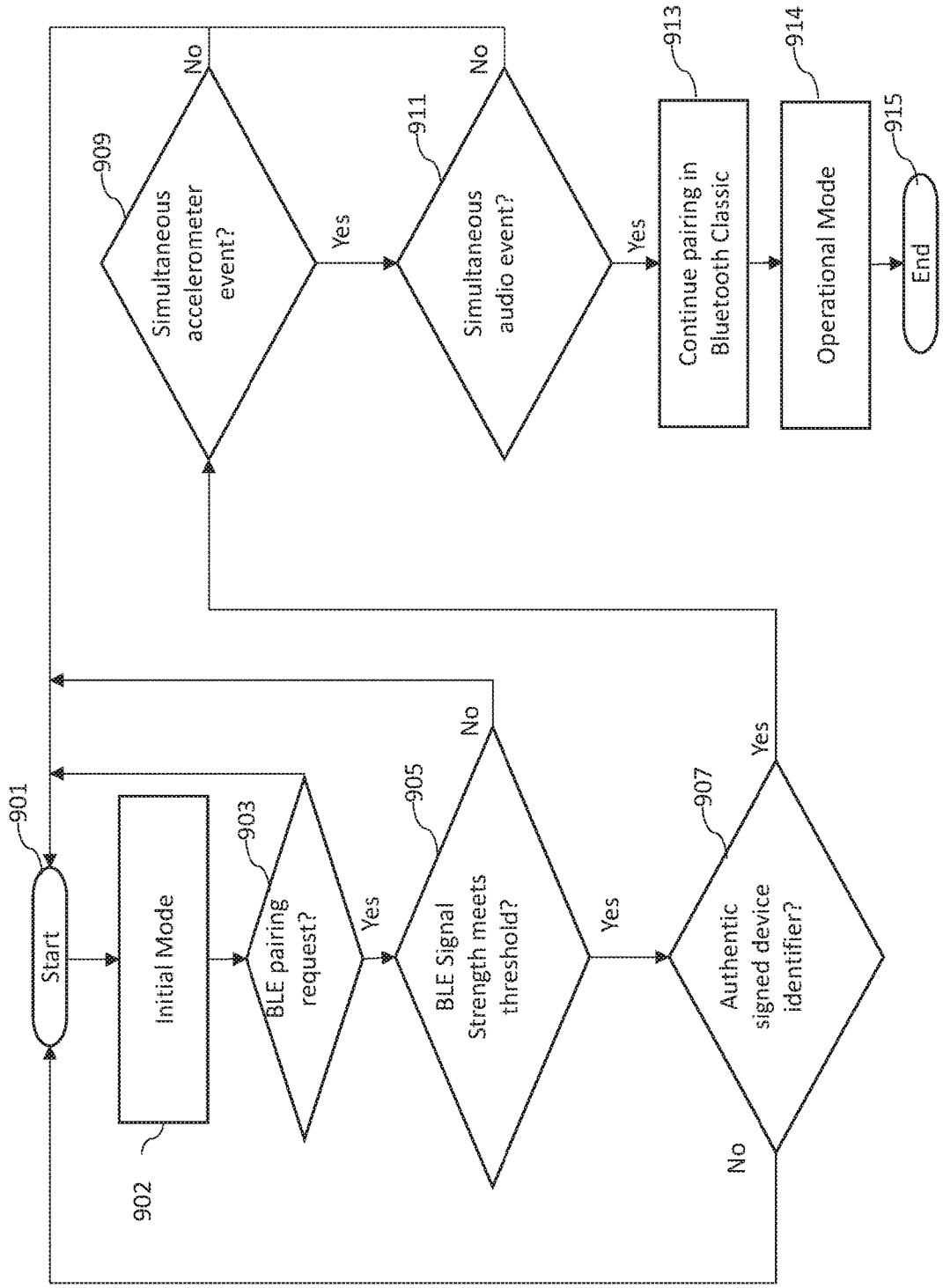
FIG. 2 is a flowchart showing a method of operating an example embodiment of the wireless communication system, according to the present disclosure.

Referring initially to FIGS. 1A-1B & 2, a wireless communication system 10 according to the present disclosure is now described. The wireless communication system 10 illustratively comprises a mobile wireless communications device 11 and a wireless accessory device 12 to be paired therewith. For example, the mobile wireless communications device 11 may comprise a XL-200P radio (FIG. 1A) modified with the teachings herein, as available from the Harris Corporation of Melbourne, Florida, the Applicant of the present application. For example, the wireless accessory device 12 may comprise a wireless handset accessory device (FIG. 1A), or a wireless speaker microphone accessory device.

The wireless accessory device 12 illustratively includes a first wireless transceiver 14, a first antenna 13 coupled to the first wireless transceiver, and a first processor 15 coupled to the first wireless transceiver and the first antenna. The wireless accessory device 12 illustratively includes a first accelerometer 24 coupled to the first processor 15, a first audio input transducer 25 coupled to the first processor, and an audio output transducer 26 coupled to the first processor.

The mobile wireless communications device 11 illustratively includes a second wireless transceiver 16, a second antenna 17 coupled to the second wireless transceiver, and a second processor 20 coupled to the second wireless transceiver and the second antenna. The mobile wireless communications device 11 illustratively includes a second accelerometer 21 coupled to the second processor 20, a second audio input transducer 22 coupled to the second processor, an additional wireless transceiver 23 coupled to the second processor, and an additional antenna 18 (e.g. whip antenna) coupled to the additional wireless transceiver. The additional wireless transceiver 23 may include a land mobile radio (LMR) transceiver device operable in at least one of a VHF band, a UHF band, a cellular telephone frequency band, or a Long-Term Evolution (LTE) frequency band.

Within the wireless accessory device 12, the first wireless transceiver 14 and the first antenna 13 are configured to be operable in an initial mode 27 and an operational mode 30 after successful pairing. Similarly, within the mobile wireless communications device 11, the second wireless transceiver 16 and the second antenna 17 are configured to be operable in the initial mode 27 and the operational mode 30 after successful pairing. The initial mode 27 may have a shorter range and lower transmission power level than the operational mode 30. In other words, for both the wireless accessory device 12 and the mobile wireless communications device 11, the same antenna and transceivers are used for both the initial mode 27 and the operational mode 30.

In some embodiments, each of the first wireless transceiver 14 and the second wireless transceiver 16 may comprise a dual-mode Bluetooth transceiver so that the initial mode 27 uses BLE, and the operational mode 30 uses Bluetooth Classic. In initial mode, the first wireless transceiver 14 and the second wireless transceiver 16 are configured to operate at a low transmission power level for BLE proximity detection. Of course, other wireless standards for short range communications can be used, such as an ultra-wideband (UWB) wireless communications standard, or the ZigBee (IEEE 802.15.4) wireless communications standard. The only requirement is that the wireless communications standard permit power level control to a floor level sufficient to limit range to a few 10s of centimeters to provide for the initial mode 27.

While in the initial mode 27, the mobile wireless communications device 11 is configured to exchange pairing tokens with the wireless accessory device 12. The pairing tokens may comprise respective secret keys.

In some embodiments, once the pairing tokens have been exchanged in the initial mode 27, a secure typical pairing process is performed at a greater transmission power level, for example, Bluetooth Classic (i.e. using the known pairing tokens to authenticate the pairing). In other words, the pairing includes a first step of exchanging of the pairing tokens in the initial mode 27 and a second step using numeric comparison for secure pairing at the greater transmission power level. Once the pairing (i.e. both initial mode 27 and the numeric comparison authentication at the greater transmission power level) is completed, the mobile wireless communications device 11 is configured to communicate with the wireless accessory device 12 using the operational mode 30 after successful pairing.

In other embodiments, the entire pairing process is performed in the initial mode 27. In other words, the exchange of the pairing tokens and the secure pairing is completed in the initial mode 27 and at the lower transmission power level.

With reference to a flowchart 900, an example embodiment of the method for performing the pairing process is now described. (Block 901). As will be appreciated, the flowchart 900 may represent logical operations of either the mobile wireless communications device 11 or the wireless accessory device 12, and the roles can be readily swapped. For exemplary purposes, the following description is from the perspective of the wireless accessory device 12, but it should be appreciated that similar logic could be implemented with the mobile wireless communications device 11.

At block 902, the mobile wireless communications device 11 and the wireless accessory device 12 enter into the initial mode 27, and a pairing request from the mobile wireless communications device is received at the wireless accessory device. (Block 903). Here, the wireless accessory device 12 or the mobile wireless communications device 11 have been placed in a pairing state (i.e. an advertising mode), which is part of the initial mode 27. For instance, again from the exemplary example of the wireless accessory device 12, the mobile wireless communications device 11 is placed in the pairing state and advertises itself using lower power transmission BLE message with a limited range (e.g. <1 foot).

The pairing request would be in the initial mode 27, and for example, would be transmitted in the BLE mode of the Bluetooth wireless standard. At Block 905, the wireless accessory device 12 is configured to determine a signal strength from the mobile wireless communications device 11 during pairing. If the signal strength is below a threshold, the wireless accessory device 12 is configured to halt the pairing. As will be appreciated, the wireless accessory device 12 is configured to use the signal strength measurement as a proxy for a distance to the mobile wireless communications device 11. In other words, physical proximity and access is being used to determine security access.

At Block 907, the wireless accessory device 12 is configured to determine a signed device identifier value from the mobile wireless communications device 11 during pairing. The signed device identifier is compared to a database of existing signed device identifiers for authenticity. If the signed device identifier cannot be authenticated, the wireless accessory device 12 is configured to halt the pairing.

At Block 909, the first accelerometer 24 of the wireless accessory device 12 is configured to determine a physical bump by the mobile wireless communications device 11 during pairing. Of course, the second accelerometer 21 of the mobile wireless communications device 11 could also or alternatively be configured to determine a physical bump by the wireless accessory device 12 during pairing. In fact, in some embodiments, the first accelerometer 24 is omitted, and only the mobile wireless communications device 11 includes an accelerometer, i.e. the second accelerometer 21. In other embodiments, the arrangement could be reversed, and only the wireless accessory device 12 comprises an accelerometer, i.e. the first accelerometer 24. Indeed, in yet other embodiments, the first and second accelerometers 24, 21 are both omitted and the other security authentication measures are relied upon, i.e. one or both of signal strength, device identifier, and audio event detection.

Again, in the illustrated exemplary embodiment, the detected physical accelerometer event is used as a proxy for physical access and security. If the physical bump is not detected, the wireless accessory device 12 is configured to halt the pairing.

At Block 911, the first audio input transducer 25 of the wireless accessory device 12 is configured to sense an audio tone from the mobile wireless communications device 11 during pairing. Of course, the second audio input transducer 22 of the mobile wireless communications device 11 could also or alternatively be configured to sense an audio tone from the wireless accessory device 12 during pairing. Similarly, the detected audio event is used as a proxy for physical access and security. If the audio tone is not detected, the wireless accessory device 12 is configured to halt the pairing.

In some embodiments, the first audio input transducer 25 is omitted, and only the mobile wireless communications device 11 includes an audio input transducer, i.e. the second audio input transducer 22. In other embodiments, the arrangement could be reversed, and only the wireless accessory device 12 comprises an audio input transducer, i.e. the first audio input transducer 25. Indeed, in yet other embodiments, the first and second audio input transducers 25, 22 are both omitted and the other security authentication measures are relied upon, i.e. one or both of signal strength, device identifier, and accelerometer event detection.

As will be appreciated, the signed device identifier check, the accelerometer event check, and the audio event check are optional authentication checks to the signal strength authentication check at Block 905. Indeed, depending on the application and capabilities of the mobile wireless communications device 11 and the wireless accessory device 12, the authentication process can be customized to include one or more of these authentication checks.

If each of the security checks in Blocks 905, 907, 909 & 911 is cleared, the mobile wireless communications device 11 and the wireless accessory device 12 are configured to continue pairing at Block 913 at the greater transmission power level (e.g. Bluetooth classic) and thereafter enter the operational mode 30 at Block 914. Moreover, in some embodiments, all or a subset of the security checks in Blocks 905, 907, 909 & 911 must be cleared near simultaneously (i.e. ±100 ms). Here, assuming the mobile wireless communications device 11 was in the pairing state, the wireless accessory device 12 is configured to respond with a lower power message to setup the exchange of the pairing tokens. Of course, once the pairing tokens have been exchanged, this subsequent pairing step is performed typically within the Bluetooth wireless standard and within the Bluetooth Classic mode thereof. (Block 915).

Advantageously, since the mobile wireless communications device 11 and the wireless accessory device 12 know the values for the pairing tokens, the devices can communicate using the Bluetooth Classic without risk of the man in the middle attack. Moreover, this wireless communication system 10 may provide the security of prior OOB approaches without the need for the separate wireless transceiver. Further, the use of simultaneous accelerometer, audio events adds further security to this pairing method. Also, the pairing process in the wireless communication system 10 is performed quickly, and on the order of about 100 ms. Lastly, the teachings of the present disclosure can be implemented via software updates in radios with dual-mode Bluetooth transceivers.

Figure 3:
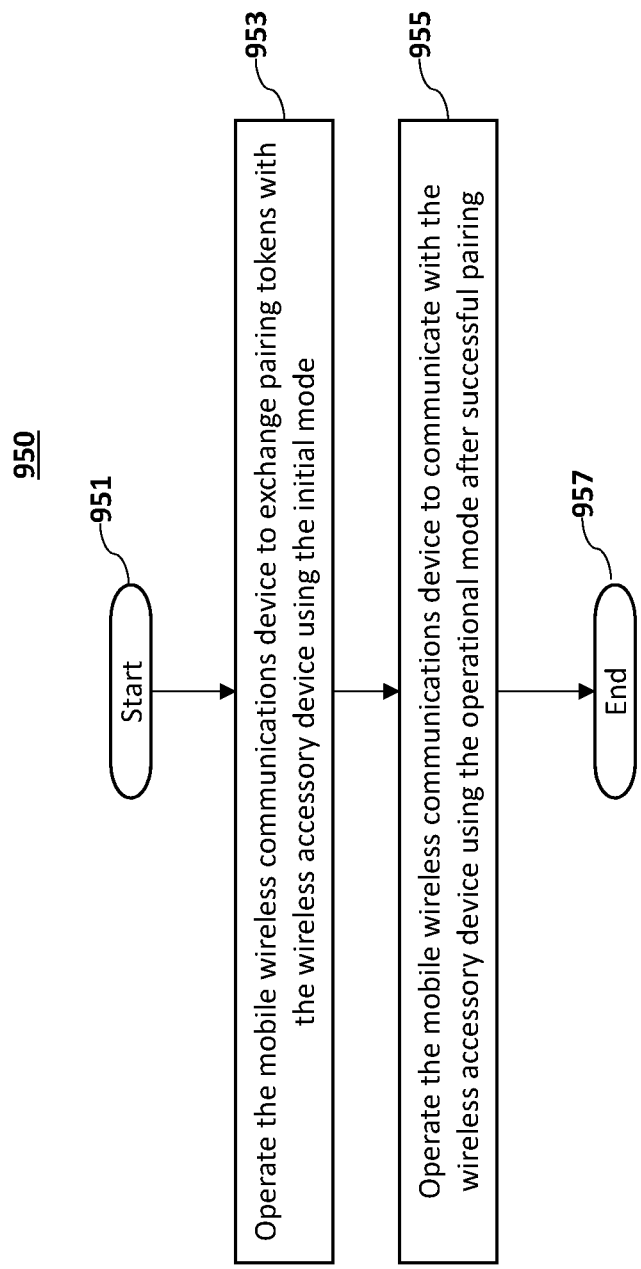
FIG. 3 is another flowchart showing a method of operating an example embodiment of the wireless communication system, according to the present disclosure.

Referring now additionally to FIG. 3 and a flowchart 950 therein, another aspect directed to a method of operating a wireless communication system 10 is now described. (Block 951). The wireless communication system 10 illustratively comprises a mobile wireless communications device 11 and a wireless accessory device 12 to be paired therewith. The wireless accessory device 12 illustratively includes a wireless transceiver 14 and an antenna 13 coupled thereto. The wireless transceiver 14 and the antenna 13 are operable in an initial mode 27 and an operational mode 30 after successful pairing. The initial mode 27 has a shorter range than the operational mode 30. The method illustratively comprises operating the mobile wireless communications device 11 to exchange pairing tokens with the wireless accessory device 12 using the initial mode 27, and operating the mobile wireless communications device to communicate with the wireless accessory device using the operational mode 30 after successful pairing. (Blocks 953, 955, 957).

In the following, an exemplary discussion of the wireless communication system 10 is now provided.

BLE feature highlights include: low power, energy efficient; low cost, small size technology; leverages classic Bluetooth technology (same radio frequency (RF) band, reuses host controller interface (HCI) layer, Logical link control and adaptation protocol (L2CAP)); reliable point-to-multipoint data transfer; fully compatible (non-interfering) with existing 2.4 GHz WiFi systems; proximity sensing; low latency; larger number of sensor devices available and planned; key connecting technology for the Internet of Things; and wide support from technology leaders.

BLE allows the reuse of the majority of existing elements of Bluetooth radios. It operates in the 2.4 GHz industrial, scientific and medical (ISM) band using a 40-channel partition, with channels being spaced 2 MHz apart. Although the specification defines a range of output RF power the same as for regular Bluetooth, all the way up to +10 dBm, it is assumed that for most of BLE applications 0 dBm is a more suitable level for RF output due to power constraints. To mitigate interference in such a crowded band, BLE uses frequency hopping, but in contrast to regular Bluetooth, BLE stays longer on the same channel and makes timing requirements much more relaxed compared to regular Bluetooth. Three RF channels are dedicated for advertising functions that allow the discovery of devices available in the vicinity. Upon a connection request, the same channels are used for initial connection parameter exchanges. Once a device is discovered and connection is initiated, regular data channels are used for communication.

In order to establish a connection, one device has to be in an advertising mode (and allow for a connection) and the other device in initiator mode with the intent of establishing a connection. The initiator scans for a desirable device-advertising packet and consequently sends a connection request. Once a connection is established, the initiator assumes the role of master device (radio) and the advertiser becomes a slave device (accessory). Slave devices may have only one connection at a time, while master devices may have multiple connections with different slave devices simultaneously. This asymmetrical approach allows slave devices to be very small in the sense of resources and hardware cost. Receive signal strength (RSSI) measurements are available to the master device for every received advertising packet sent from a slave.

The RSSI value of a BLE device can be used as one factor in a secure pairing mechanism. Requiring a minimum RSSI value, characteristic of a device located within a few centimeters of the radio, would be the first step on a secure pairing procedure. The output power of a BLE sensor system-on-chip (SoC) device, such as the Texas Instruments CC2541 (as available from Texas Instruments Inc. of Dallas, Texas), can be programmed to transmit a reduced level output power. The CC2541 "TXPOWER" register allows setting the transmit power level from a maximum of 0 dBm down to a minimum of −23 dBm. A combination WiFi/BLE module, such as the Texas Instruments WiLink 8 module (as available from Texas Instruments Inc. of Dallas, Texas), has at least 8 discrete transmit power level settings, which can be set using a vendor specific command. Operating the mobile wireless communications device and Bluetooth audio accessory at reduced BLE output power will require close proximity during the pairing process.

A possible second step would be the recording of a "bump" or "tap" of the two devices by the radio, while a required average RSSI threshold was maintained or exceeded. To prevent inadvertent pairing, two "taps" over a short interval of time, might be required for the process to complete. After pairing, the radio and accessory can use the BLE link to exchange information needed to establish a secure classic Bluetooth connection between the radio and the accessory (speaker-microphone).

This secure pairing process uses technology (BLE, accelerometer) in the LMR devices. This process is unique and can provide the same level of protection against man in the middle attacks. It would not require that the accessory have an accelerometer device (in place of an NFC tag) to detect the bump event during the pairing process.

BLE supported data transfer rates (~305 kbps) are comparable to NFC data transfer rates (~424 kbps). Either technology can support transferring moderately sized data files (personality scripts) between LMR devices in a few seconds. While NFC can support data transfers only out to a maximum of 10 cm, BLE can connect and transfer data over a much wider range, up to 50 meters.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A wireless communication system comprising:
a mobile wireless communications device and a wireless accessory device to be paired therewith;
said wireless accessory device comprising
a wireless transceiver and an antenna coupled thereto, the wireless transceiver and said antenna being operable in an initial mode and an operational mode after successful pairing, the initial mode having a shorter range and a lower transmission power level than the operational mode;
said mobile wireless communications device comprising an accelerometer;
said mobile wireless communications device configured to
determine a signal strength from said wireless accessory device during the pairing,
sense an audio tone from the wireless accessory device during pairing,
configured to determine, using the accelerometer, a physical bump by said wireless accessory device during pairing, and
when the audio tone from the wireless accessory device is sensed, when the signal strength from said wireless accessory device exceeds a threshold signal strength indicative of said wireless accessory device being adjacent said mobile wireless communications device, and when the physical bump by said wireless accessory device is detected, exchange pairing tokens with said wireless accessory device using the initial mode having the shorter range and the lower transmission power level than the operational mode,
the audio tone being sensed, the signal strength from said wireless accessory device exceeding the threshold signal strength, and the physical bump by said wireless accessory device all being detected concurrently for exchanging the pairing tokens, and
communicate with said wireless accessory device using the operational mode after successful pairing.

2. The wireless communication system of claim 1 wherein said wireless transceiver comprises a dual-mode Bluetooth transceiver so that the initial mode uses Bluetooth Low Energy, and the operational mode uses Bluetooth Classic.

3. The wireless communication system of claim 1 wherein said wireless accessory device comprises an accelerometer configured to determine a physical bump by said mobile wireless communications device during pairing.

4. The wireless communication system of claim 1 wherein said mobile wireless communications device comprises an audio input device configured to sense the audio tone from said wireless accessory device during pairing.

5. The wireless communication system of claim 1 wherein said mobile wireless communications device is configured to determine a signed device identifier value from said wireless accessory device during pairing.

6. The wireless communication system of claim 1 wherein said mobile wireless communications device comprises a land mobile radio device operable in at least one of a very high frequency (VHF) band, an ultra high frequency (UHF) band, and a cellular telephone frequency band.

7. The wireless communication system of claim 1 wherein said wireless accessory device comprises at least one of an audio input transducer and an audio output transducer.

8. The wireless communication system of claim 1 wherein the audio tone being sensed, the signal strength from said wireless accessory device exceeding the threshold signal strength, and the physical bump by said wireless accessory device are simultaneous within 0.1 seconds of each other.

9. A mobile wireless communications device to be paired with a wireless accessory device comprising a first wireless transceiver and a first antenna coupled thereto, the first wireless transceiver and the first antenna being operable in an initial mode and an operational mode after successful pairing, the initial mode having a shorter range and a lower transmission power level than the operational mode, the mobile wireless communications device comprising:
a second wireless transceiver;
a second antenna coupled thereto;
an accelerometer configured to determine a physical bump by the wireless accessory device during pairing; and
a processor coupled to said second wireless transceiver and said second antenna, and configured to
determine a signal strength from the wireless accessory device during the pairing,
sense an audio tone from the wireless accessory device during pairing, and
when the audio tone from the wireless accessory device is sensed, when the signal strength from the wireless accessory device exceeds a threshold signal strength indicative of the wireless accessory device being adjacent the mobile wireless communications device, and when the physical bump by said wireless accessory device is detected, exchange pairing tokens with the wireless accessory device using the initial mode having the shorter range and the lower transmission power level than the operational mode, the audio tone being sensed, the signal strength from the wireless accessory device exceeding the threshold signal strength, and the physical bump by the wireless accessory device all being detected concurrently for exchanging the pairing tokens, and
communicate with the wireless accessory device using the operational mode after successful pairing.

10. The mobile wireless communications device of claim 9 wherein said second wireless transceiver comprises a dual-mode Bluetooth transceiver so that the initial mode uses Bluetooth Low Energy, and the operational mode uses Bluetooth Classic.

11. The mobile wireless communications device of claim 9 further comprising an audio input device configured to sense the audio tone from the wireless accessory device during pairing.

12. The mobile wireless communications device of claim 9 wherein said processor is configured to determine a signed device identifier value from the wireless accessory device during pairing.

13. The mobile wireless communications device of claim 9 further comprising a land mobile radio device operable in at least one of a very high frequency (VHF) band, an ultra high frequency (UHF) band, and a cellular telephone frequency band.

14. The mobile wireless communications device of claim 9 wherein the audio tone being sensed, the signal strength from the wireless accessory device exceeding the threshold signal strength, and the physical bump by the wireless accessory device are simultaneous within 0.1 seconds of each other.

15. A method of operating a wireless communication system comprising a mobile wireless communications device and a wireless accessory device to be paired therewith, the wireless accessory device comprising a wireless transceiver and an antenna coupled thereto, the wireless transceiver and the antenna being operable in an initial mode and an operational mode after successful pairing, the initial mode having a shorter range and a lower transmission power level than the operational mode, the method comprising:
operating the mobile wireless communications device to determine a signal strength from the wireless accessory device during pairing, and to sense an audio tone from the wireless accessory device during the pairing;
operating the mobile wireless communications device so that an accelerometer determines a physical bump by the wireless accessory device during the pairing;
operating the mobile wireless communications device to, when the audio tone from the wireless accessory device is sensed, when the signal strength from the wireless accessory device exceeds a threshold signal strength indicative of the wireless accessory device being adjacent the mobile wireless communications device, and when the physical bump by the wireless accessory device is detected, exchange pairing tokens with the wireless accessory device using the initial mode having the shorter range and the lower transmission power level, the audio tone being sensed, the signal strength from the wireless accessory device exceeding the threshold signal strength, and the physical bump by the wireless accessory device all being detected concurrently for exchanging the pairing tokens; and
operating the mobile wireless communications device to communicate with the wireless accessory device using the operational mode after successful pairing.

16. The method of claim 15 further comprising operating the mobile wireless communications device and the wireless accessory device so that the initial mode uses Bluetooth Low Energy, and the operational mode uses Bluetooth Classic.

17. The method of claim 15 further comprising operating the wireless accessory device so that an accelerometer determines a physical bump by the mobile wireless communications device during pairing.

18. The method of claim 15 further comprising operating the mobile wireless communications device so that an audio input device senses the audio tone from the wireless accessory device during pairing.

19. The method of claim 15 further comprising operating the mobile wireless communications device to determine a signed device identifier value from the wireless accessory device during pairing.

20. The method of claim 15 wherein the audio tone being sensed, the signal strength from the wireless accessory device exceeding the threshold signal strength, and the physical bump by the wireless accessory device are simultaneous within 0.1 seconds of each other.

* * * * *